United States Patent
Raets et al.

(10) Patent No.: US 6,587,359 B2
(45) Date of Patent: Jul. 1, 2003

(54) DC-DC CONVERTER WITH SWITCHABLE CONTROL MODE

(75) Inventors: Hubert Raets, Landgraaf (NL); Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/118,871

(22) Filed: Apr. 9, 2002

(65) Prior Publication Data

US 2002/0176264 A1 Nov. 28, 2002

(30) Foreign Application Priority Data

Apr. 11, 2001 (DE) .......................... 101 18 040

(51) Int. Cl.[7] .................. H02M 3/335; H02M 7/68; H02H 7/122
(52) U.S. Cl. .................. 363/24; 363/98; 363/56.02
(58) Field of Search ............. 363/17, 98, 132, 363/56.02, 56.03, 24

(56) References Cited

U.S. PATENT DOCUMENTS 6,246,599 B1 * 6/2001 Jang et al. ............... 363/132
6,418,038 B2 * 7/2002 Takahama et al. ........ 363/132
6,424,543 B1 * 7/2002 Zhang et al. ............. 363/132

* cited by examiner

*Primary Examiner*—Bao Q. Vu
(74) *Attorney, Agent, or Firm*—Dicran Halajian

(57) ABSTRACT

The invention relates to a DC—DC converter and a power supply unit formed thereby, with which a DC input voltage ($V_{dc}$) may be converted into two DC output voltages (U1, Usb) via a resonant switched-mode power supply. Via a circuit stage (M1, M2), a control circuit (C) generates a first AC voltage ($V_{AC}$), which is converted via two resonant circuits with different transmission behavior and two rectifiers (G1, Gsb) in frequency-dependent manner into DC output voltages (U1, Usb). To achieve a standby mode, in which the first DC output voltage (U1) is designed to be very low and hardly any power is drawn on the output side, a second, thinner auxiliary circuit stage (M3, M4) is provided, which is coupled to the resonant circuits via an inductor (L2). The current consumption of the circuit in standby mode may be reduced considerably by appropriate dimensioning.

10 Claims, 2 Drawing Sheets

DC-DC CONVERTER WITH SWITCHABLE CONTROL MODE

The invention relates to a DC—DC converter for converting a DC (direct current) input voltage into a plurality of DC output voltages, which converter may be operated in a normal operation mode and an energy-saving standby mode.

It is known, especially in the field of consumer electronics, to distinguish in relation to power supply between a normal operation mode during use of an appliance and a standby mode, wherein in standby mode the appliance does not perform its actual function but is merely ready to respond to an appropriate wake-up signal. Very much less power is required for the standby mode than for normal operation. Therefore, in such appliances a power supply unit with DC—DC converter is advantageously used, which supplies at least two output voltages which may be switched between a normal operation mode and a standby mode. The first output voltage serves to supply the main electronics of the appliance, while the other voltage merely supplies standby circuits. In standby mode, the first output voltage is conventionally reduced to zero or a very low value, while the second output voltage does not change or changes only insignificantly between normal operation mode and standby mode.

Given this background, it is an object of the present invention to provide a DC—DC converter and a power supply unit of the above-mentioned type, with which the losses arising during operation are smallest possible.

Said object is achieved by a DC—DC converter as claimed in claim 1 and a power supply unit as claimed in claim 9. Advantageous developments are included in the subclaims.

The DC—DC converter serves to convert a DC input voltage, which may be generated for example by rectification of an AC (alternating current) mains voltage, into a plurality of DC output voltages, of which typically one supplies the main electronics of an electronic appliance and another supplies the appliance's standby electronics. The converter comprises

- a main circuit stage with switching elements for converting the DC input voltage at the input of the main circuit stage into a first AC voltage, which is passed via the outputs of the main circuit stage to two delivery nodes;
- an auxiliary circuit stage with auxiliary switching elements and an auxiliary inductor for converting the DC input voltage at the inputs of the auxiliary circuit stage into a second AC voltage, which is passed via the outputs of the auxiliary circuit stage to the two above-mentioned delivery nodes;
- a first resonant circuit for converting the AC voltages at the delivery nodes into a first AC output voltage, which serves to generate a first DC output voltage by means of a first rectifier;
- a second resonant circuit for converting the AC voltages at the delivery nodes into a second AC output voltage, which serves to generate a second DC output voltage by means of a second rectifier and
- a control circuit for activating the main circuit stage and the auxiliary circuit stage.

By appropriate activation of the main circuit stage or the auxiliary circuit stage via the control circuit, the DC input voltage at the circuit stages may be converted into a pulse-form AC voltage with a given frequency and a given mark-space ratio. This AC voltage is then fed to the two resonant circuits, which convert it into DC output voltages of appropriate magnitude depending on the position of its resonant frequency. The level of each DC output voltage may thus be varied via the frequency of the fed-in AC voltage, i.e. via the frequency with which the control circuit actuates the circuit stages.

The use of two circuit stages, the main circuit stage and the auxiliary circuit stage, has the advantage that these circuit stages may be optimally designed in each case for different operating modes of the DC—DC converter. In this way, it is possible in particular to design the different modes to be particularly energy efficient.

The auxiliary circuit stage is preferably designed for lower levels of power consumption than the main circuit stage. The auxiliary circuit stage may thus advantageously be used when the DC—DC converter is in an operating mode in which lower power levels are required on the output side. Such a mode of operation may correspond in particular to the standby mode of an electronic appliance.

According to a preferred development, the auxiliary circuit stage and the control circuit may be jointly constructed as an integrated circuit. This is possible in particular when the auxiliary circuit stage is intended for lower loads, such that it may be designed without difficulty as an integrated circuit.

The control circuit is advantageously so arranged or programmed that it may be operated as desired in normal operating mode or in standby mode. In normal operating mode, it activates the main circuit stage in such a way that the latter generates a first AC voltage in a first frequency range Df1, while, in standby mode, it activates the auxiliary circuit stage in such a way that the latter generates a second AC voltage in a second frequency range Df2. In normal operating mode and in standby mode respectively, the auxiliary circuit stage and the main circuit stage are then in each case unused or activated in such a way that they do not generate any output voltages. The output voltages generated from the first frequency range or the second frequency range respectively are converted, as explained above, via the resonant circuits and rectifiers into DC output voltages of varying magnitudes. One advantage in this situation is the fact that, in a standby mode with relatively low output-side power consumption, the necessary AC voltage may be generated on the input side of the resonant circuits by a suitably dimensioned (i.e. preferably thinner) circuit stage. In this way, the activation power and thus the current consumption of the DC—DC converter drops in stand-by operation.

For potential separation between the voltages at the delivery nodes and the outputs of the resonant circuits, a transformer may be provided which has a first primary winding associated with one of the two resonant circuits, a secondary winding associated with the first resonant circuit and a second secondary winding associated with the second resonant circuit. Furthermore, the transformer may comprise a second primary winding, which forms the auxiliary inductor of the auxiliary circuit stage. In this way, it is unnecessary to provide an additional separate component to constitute the auxiliary inductor.

The main circuit stage may alternatively take the form of a half-bridge circuit comprising two switching elements or a full bridge circuit comprising four switching elements. The auxiliary circuit stage preferably takes the form of a half-bridge circuit including two switching elements.

In addition to the first resonant circuit, the DC—DC converter may include one or more further output circuits, which provide further main outputs. In the further output circuits, the AC voltages at the delivery nodes are converted into AC output voltages, which serve to generate the further DC output voltages.

The invention further relates to a power supply unit which is characterized in that it includes a DC—DC converter of the above-described type. Such a power supply unit is suitable, in particularly current-saving manner, for normal current supply of an electronic appliance in normal operating mode and for supplying the appliance with reduced power in standby mode.

The invention will be further described with reference to examples of embodiment shown in the drawings to which, however, the invention is not restricted. In the Figures.

Figure 1:
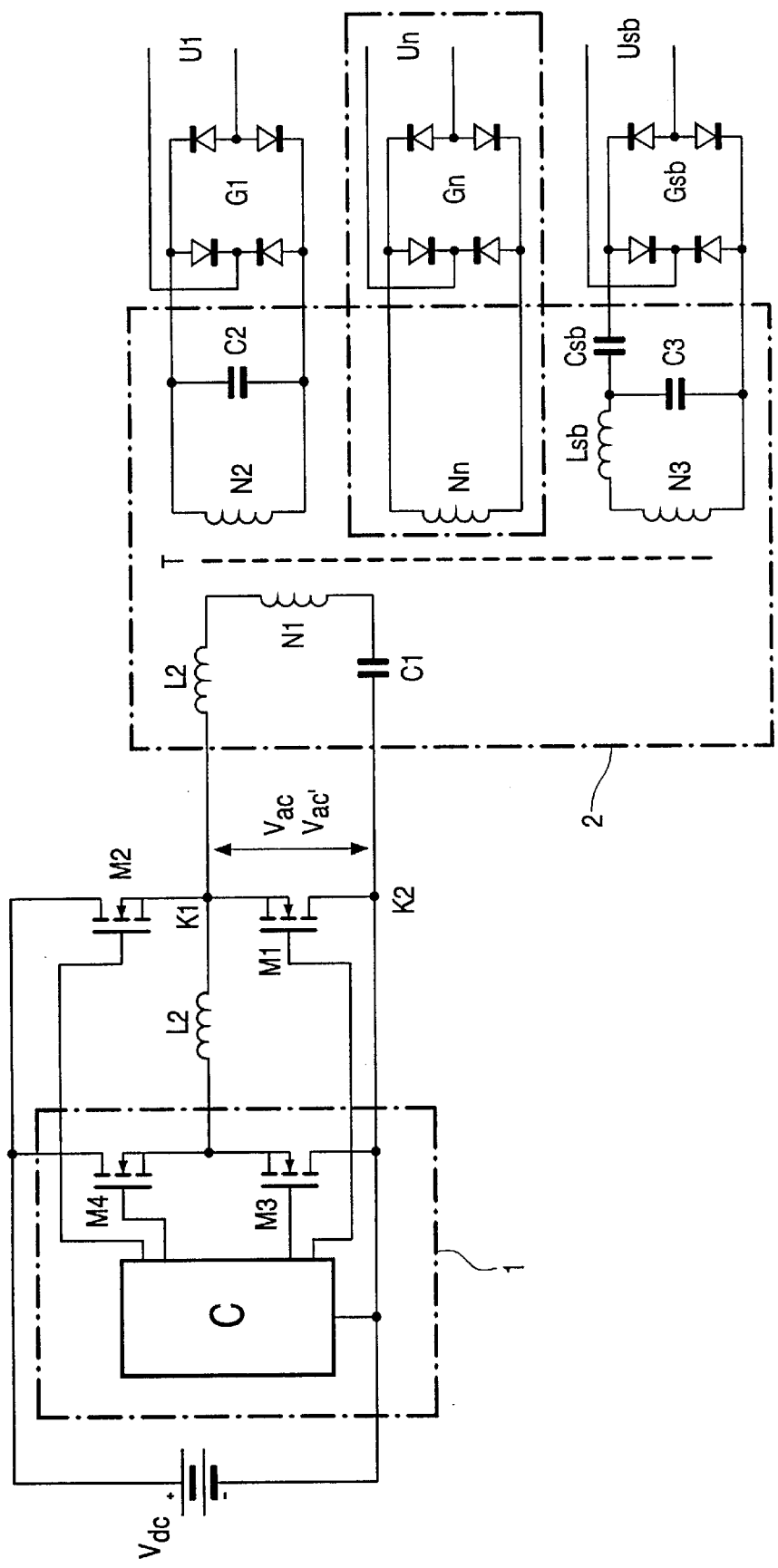
FIG. 1 is a circuit diagram of a DC—DC converter according to the invention of the LCC type.

FIG. 1 is a circuit diagram of a preferred development of the DC—DC converter according to the invention. The DC—DC converter converts a DC input voltage $V_{dc}$ into two DC output voltages U1 and Usb. The first output voltage U1 may serve in particular in supplying the main electronics of an appliance such as for example a TV appliance (monitor). On the other hand, the second output voltage Usb is preferably used to supply the standby electronics of the appliance and is therefore as a rule markedly smaller or lower-powered than the output voltage U1. Moreover, the DC—DC converter should be switchable between a normal operating mode and a standby mode, wherein in the standby mode the voltage U1 is at least approximately equal to zero.

The above-described behavior of the circuit is achieved with the lowest possible power consumption by the structure explained below.

The input voltage $V_{dc}$ is firstly fed via a main circuit stage, which in the present case takes the form of a half-bridge circuit with the switching elements M1 and M2 positioned in series. The switching elements may take the form in particular of MOS field effect transistors. They are activated, i.e. opened and closed, via a control circuit C, which may take the form in particular of an integrated circuit. By appropriately timed opening and closing of the switching elements, the input voltage $V_{dc}$, chopped in pulse form, may be applied with a predeterminable frequency and an adjustable mark-space ratio (ratio of the times with and without applied voltage $V_{dc}$) to the node K1, which is located between the two switching elements M1 and M2, and the node K2, which is located between the switching element M1 and a pole of the input voltage $V_{dc}$. In this way, a first AC voltage $V_{AC}$ arises between the two nodes K1 and K2.

The AC voltage applied to the nodes K1 and K2 is converted by a so-called resonant converter 2 with two different resonant circuits into two AC output voltages, which are in each case converted via a rectifier G1 or Gsb into the DC output voltages U1 and Usb. The resonant converter 2 is connected on the input side with the two nodes K1 and K2. From the first node K1, this connection leads via a first inductor L1 and the primary winding of a transformer T (winding number N1) and a capacitor C1 back to the second node K2.

The voltage fed into the transformer T on the primary side is tapped, in conductively decoupled manner, on the secondary side by two secondary windings with the winding numbers N2 and N3 respectively. In the first resonant circuit with the secondary winding N2, a capacitor C2 is connected in parallel with the secondary winding, the voltage of which capacitor is tapped by the above-mentioned rectifier GI and converted into the first DC output voltage U1. In the second resonant circuit a coil Lsb and a capacitor Csb are connected to the secondary winding N3. The voltage at the capacitor Csb is tapped by the rectifier Gsb via an optional further capacitor C3 and converted into the second DC output voltage Usb.

In addition to the secondary windings N2 and N3, as many additional secondary windings as desired may be provided, via which tapping for further main outputs proceeds. By way of example, a further winding Nn is shown in FIG. 1, which feeds AC voltage to a rectifier Gn for generating the DC output voltage Un. The behavior of the main output Un largely corresponds to that of the output U1. However, no capacitor corresponding to the capacitor C2 is required in the second output circuit. It is likewise permissible to distribute the capacitor C2 in appropriate manner (e.g. as parasitic capacitance over the windings N2, . . . Nn).

The above-described structure, illustrated in FIG. 1, of the resonant circuits consisting of inductors and capacitors is also known as an LCC converter, since the components L1, C1 and C2 are involved in the main function thereof, while the inductance Lh of the transformer N1, . . . Nn is negligible. The structure merely represents a possible example and may be modified in many ways by the person skilled in the art. LLC converters (inductance Lh of the transformer N1, . . . Nn very influential, C2 negligible), LC converters (only L1 and C1 important) and LLCC converters (L1, Lh, C1 and C2 important) are also often used. The only decisive factor is that an AC voltage $V_{AC}$ at the nodes K1 and K2 with a particular, frequency-dependent transmission behavior is converted at the output side into AC voltages, which may then be further converted into the DC output voltages U1 or Usb respectively.

Figure 2:
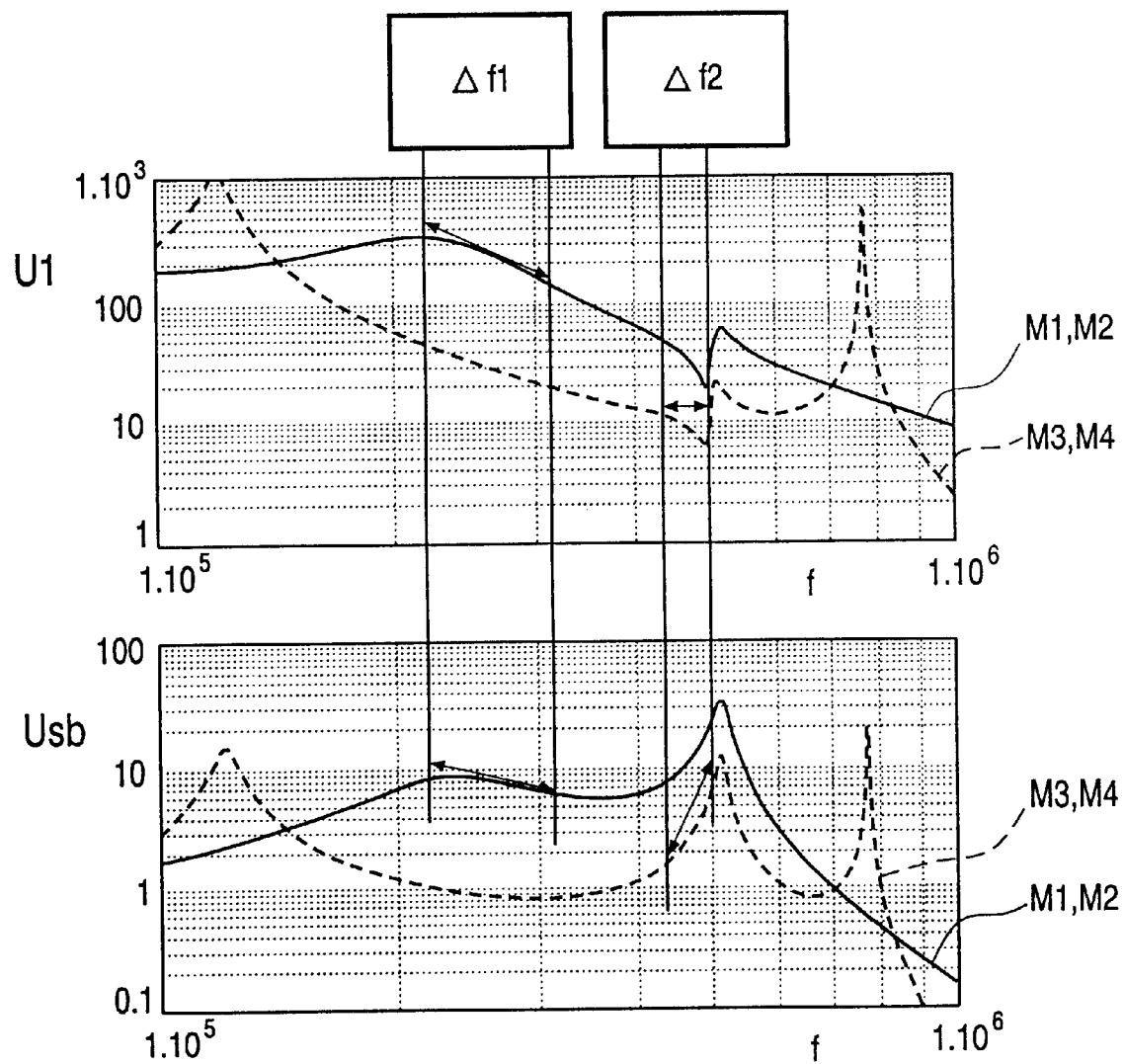
FIG. 2 shows the transmission functions of the resonant circuits of the DC—DC converter.

The frequency-dependent transmission behavior of the resonant circuits in normal operating mode is represented in FIG. 2 with continuous lines. The top diagram shows the amplification (vertical axis) of the first resonant circuit, which generates the DC output voltage U1, as a function of the frequency f (horizontal axis) of the AC voltage fed in at the nodes K1 and K2. The bottom diagram accordingly shows the amplification of the second resonant circuit, which serves to generate the DC output voltage Usb as a function of the frequency of the input voltage.

Furthermore, the diagrams illustrate the frequency ranges Df1 and Df2 within which the DC—DC converter is preferably operated. In this respect, it may be noted that the first DC output voltage U1 is very much greater in the first frequency range Df1 than in the second frequency range Df2. In contrast, the second DC output voltage Usb is of approximately equal magnitude in both frequency ranges Df1 and Df2 and comparatively smaller than the first DC output voltage U1. By switching the Dc-DC converter between the two frequency ranges Df1 and Df2, the first DC output voltage U1 may thus be as it were switched on and off while the second DC output voltage Usb remains approximately the same. The second frequency range Df1 therefore corresponds, in the event of typical utilization of the converter, to the standby mode of an appliance operated therewith.

The function of the auxiliary switching elements M3 and M4 of the circuit according to FIG. 1 has not as yet been examined. The auxiliary switching elements M3 and M4 arranged in series and forming a half-bridge circuit serve to produce an auxiliary circuit stage, which, in parallel with the main circuit stage (switching elements M1 and M2), is at the DC input voltage $V_{dc}$. The auxiliary switching elements M3 and M4 are of thinner design than the switching elements M1 and M2 of the main circuit stage and may therefore be integrated together with the control circuit C on a common chip 1.

The central point between the two auxiliary switching elements M3 and M4 is connected to the node K1 via an inductor L2. In addition or as an alternative to the inductor L2, further turns of the transformer T may also be connected in series. The other connection of the auxiliary switching element M3 is connected with the other node K2 (and a pole of the input voltage source). With the auxiliary circuit stage consisting of the auxiliary switching elements M3 and M4, a current saving may be achieved on the input side of the DC—DC converter in standby mode, in which a low power is drawn on the output side.

During standby mode operation or, depending on dimensioning, also in low load operation, the main circuit stage M1, M2 of the control circuit C is deactivated (both switching elements M1 and M2 are opened) and instead the auxiliary circuit stage M3, M4 is activated. Due to the different dimensioning of the switching elements M3 and M4 and the interconnected inductor L2, the converter exhibits different transmission behavior, which may be optimized for the necessary operating point.

The transmission behavior established upon activation of the auxiliary circuit stage M3, M4 is illustrated in FIG. 2 as a dashed curve in the diagrams. As explained above, when the DC—DC converter is in normal operating mode, an AC voltage in the first frequency range Df1 is generated via the main circuit stage M1, M2 at the nodes K1 and K2, such that a high DC output voltage U1 and a lower DC output voltage Usb are output at the outputs of the converter, said voltages U1 and Usb being labeled in FIG. 2 by the double arrows in the frequency range Df1.

On switching of the control circuit C into standby mode, said control circuit C opens the main circuit stage (M1, M2) and instead activates the auxiliary circuit stage (M3, M4) with a frequency from the range Df2. The associated DC output voltages are plotted in the diagrams of FIG. 2 on the dashed curve, which belongs to the auxiliary circuit stage. They are again labeled in the frequency range Df2 by double arrows, wherein it is clear that the DC output voltage U1 is very much lower than in normal operating mode and that the DC output voltage Usb is of approximately equal magnitude to normal operating mode.

By adapting the converter to standby operation, considerably lower power consumption may be achieved, and the components of the standby circuit may be smaller and cheaper. The improvement in power consumption in standby operation is obtained substantially by:

the reduction in activation power;
the reduction in reactive power;
the reduction in current in the primary and secondary windings of the transformer T and in the standby resonant circuit.

Because of the considerably smaller currents in the secondary winding N3 of the second resonant circuit during standby operation, substantial savings are possible by using the simplest components in the second resonant circuit and using thinner wire for this winding. Further savings are obtained due to the considerably smaller primary current in standby mode owing to the complete integration of the additionally required components on the primary side. That is to say that the inductor L2 may be integrated in the transformer T, wherein it is additionally possible to change the turn N1 in standby mode. With appropriate dimensioning, the current flowing in standby mode may even be so small that the half-bridge consisting of M3 and M4 may be integrated on the chip of the control circuit C.

The resonance of the second resonant circuit for the output voltage Usb may be of lower quality, whereby the possible control range in standby mode is greater. The voltage Usb may therefore be precisely adjusted.

Due to the smaller half-bridge with the switching elements M3 and M4, the activating power required (for the gate charges) becomes minimal. A reduction in the current by the factor 4.5 allows the use of field effect transistors for M3 and M4 with a 20-fold resistance (4.5$^2$). These exhibit approximately a 20th of the input capacitance. The power required for activation is consequently only a 20th and remains at minimal values (<20 mW) even at high frequencies. Thanks to the circuit according to the invention, the standby consumption of the circuit may be reduced from the present value of 3 W to 1 W, the costs also being reduced.

The principle described with reference to the Figures for the half-bridge circuit consisting of M1 and M2 may also be used in the case of full bridge circuits for the main circuit stage. Three half-bridges are then used (two large ones for the main circuit stage and an auxiliary bridge), and the various input voltages are controlled via the frequency.

List of Reference Numerals:
1 Chip with control circuit and auxiliary circuit stage
2 Resonant circuits
C Control circuit
C1, C2, C3, Cn, Csb Capacitors
G1, Gn, Gsb Rectifiers
K1, K2 Delivery nodes
L1, Lsb Inductors
L2 Auxiliary inductor
M1, M2 Switching elements
M3, M4 Auxiliary switching elements
N1, N2, N3, Nn Windings
T Transformer
U1, Un DC output voltage for normal operation
Usb DC output voltage for standby operation
$V_{AC}$, $V_{AC}'$ AC voltages
$V_{dc}$ DC input voltage

What is claimed is:

1. A DC—DC converter for converting a direct current (DC) input voltage into a plurality of DC output voltages, which converter may be operated in a normal operation mode and an energy-saving mode, wherein said DC—DC converter includes:

a main circuit stage comprising switching elements (M1, M2) for converting the DC input voltage (Vdc) into a first AC voltage (Vac) at two delivery nodes (K1, K2), an auxiliary circuit stage comprising auxiliary switching elements (M3, M4) and an auxiliary inductor (L2) for converting the DC input voltage (Vdc) into a second AC voltage at the two delivery nodes;

a first resonant circuit for converting the AC voltages at the delivery nodes into a first AC output voltage, which serves to generate a first DC output voltage in a first frequency range, said first DC output voltage being provided at a main output for supplying the main electronics of an appliance;

a second resonant circuit for converting the AC voltages at the delivery nodes into a second AC output voltage, which serves to generate a second DC output voltage at a second level in a second frequency range, said second DC output voltage being provided at a standby output for supplying the standby electronics of said appliance; and a control circuit for activating one of the main circuit stage and the auxiliary circuit stage wherein when said first DC output voltage is substantially greater in said first frequency range than said second frequency range and said second DC output voltage is substantially the same in said first and second frequency ranges.

2. A DC—DC converter as claimed in claim 1, wherein the auxiliary circuit stage is designed for lower levels of power consumption than the main circuit stage.

3. A DC—DC converter as claimed in claim 1, wherein the switching elements (M3, M4) of the auxiliary circuit stage and the control circuit (C) form an integrated circuit (1).

4. A DC—DC converter as claimed in claim 1, wherein the control circuit (C) is so arranged that, in normal operating mode, it generates a first AC voltage ($V_{AC}$) in a first frequency range (Df1) via only the main circuit stage (M1, M2) and in standby mode it generates a second AC voltage ($V_{AC}'$) in a second frequency range (Df2) via only the auxiliary circuit stage (M3, M4).

5. A DC—DC converter as claimed in claim 1, wherein a transformer (T) effecting potential separation between the delivery nodes (K1, K2) and the first and second AC output voltages is provided, which comprises a primary winding (N1) associated with one of the two resonant circuits, a first secondary winding (N2) associated with the first resonant circuit and a second secondary winding (N3) associated with the second resonant circuit.

6. A DC—DC converter as claimed in claim 5, wherein the auxiliary inductor takes the form at least in part of a primary winding of the transformer (T).

7. A DC—DC converter as claimed in at least one of claims 1 to 6, wherein the main circuit stage for converting the DC input voltage ($V_{dc}$) into the first AC voltage (VAC) includes a half-bridge circuit comprising two switching elements (M1, M2) or a full bridge circuit comprising four switching elements.

8. A DC—DC converter as claimed in claim 1, wherein the auxiliary circuit stage includes a half-bridge circuit comprising two switching elements (M3, M4).

9. A DC—DC converter as claimed in claim 1, wherein it includes at least a further output circuit (L1, N1, C1, Nn) for converting the AC voltages ($V_{AC}$; $V_{AC}'$) at the delivery nodes (K1, K2) into a further AC output voltage, which serves to generate a further DC output voltage (Un).

10. A power supply including a DC—DC converter as claimed in claim 1 for converting a direct current (DC) input voltage into a plurality of DC output voltages, which converter may be operated in a normal operation mode and an energy-saving mode, wherein said DC—DC converter includes:

a main circuit stage comprising switching elements (M1, M2) for converting the DC input voltage (Vdc) into a first AC voltage (Vac) at two delivery nodes (K1, K2);

an auxiliary circuit stage comprising auxiliary switching elements (M3, M4) and an auxiliary inductor (L2) for converting the DC input voltage (Vdc) into a second AC voltage at the two delivery nodes;

a first resonant circuit for converting the AC voltages at the delivery nodes into a first AC output voltage, which serves to generate a first DC output voltage in a first frequency range, said first DC output voltage being provided at a main output for supplying the main electronics of an appliance;

a second resonant circuit for converting the AC voltages at the delivery nodes into a second AC output voltage, which serves to generate a second DC output voltage in a second frequency range, said second DC output voltage being provided at a standby output for supplying the standby electronics of said appliance; and a control circuit for activating one of the main circuit stage and the auxiliary circuit stage wherein when said first DC output voltage is substantially greater in said first frequency range than said second frequency range and said second DC output voltage is substantially the same in said first and second frequency ranges.

* * * * *